UNITED STATES PATENT OFFICE.

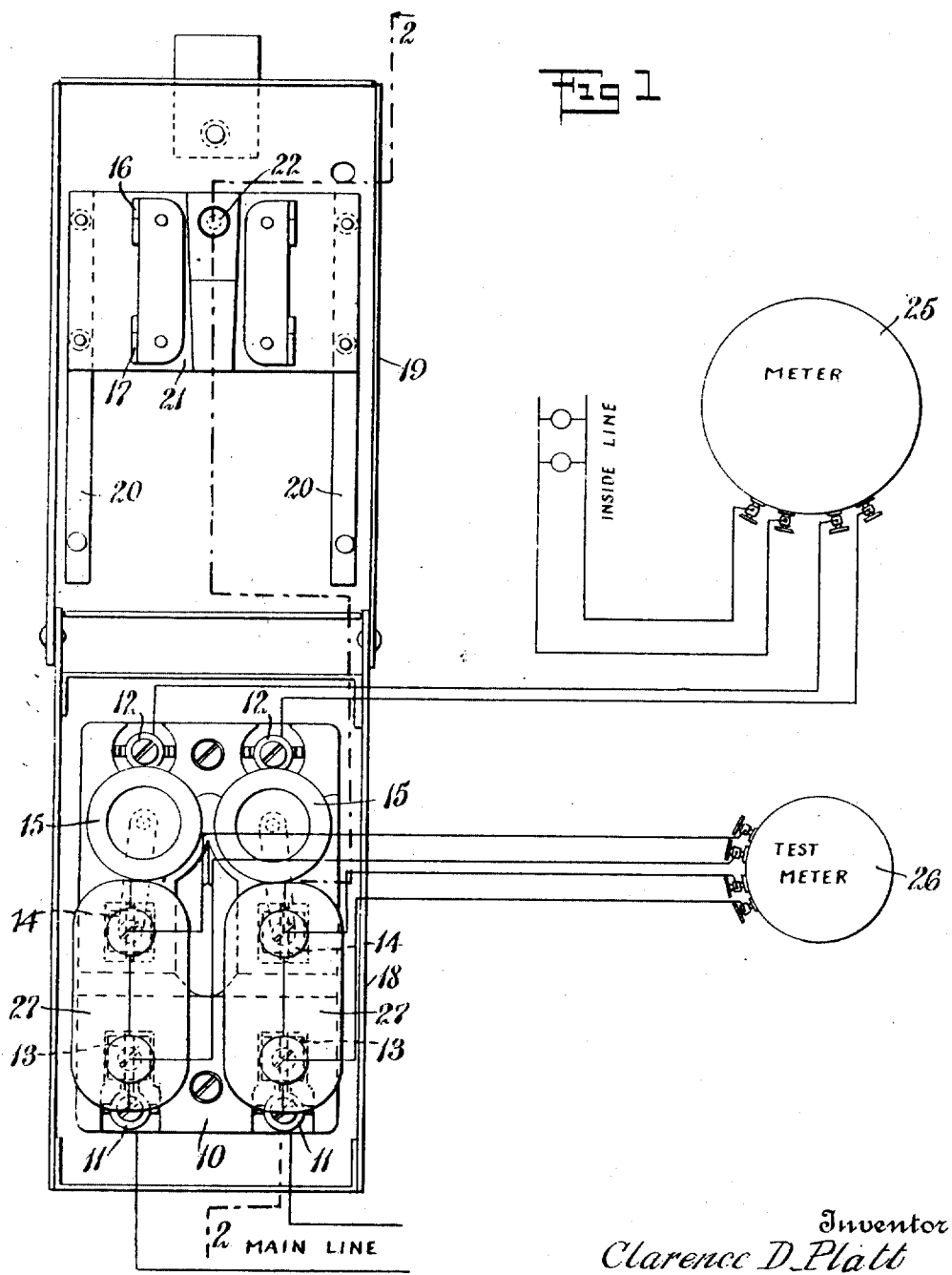

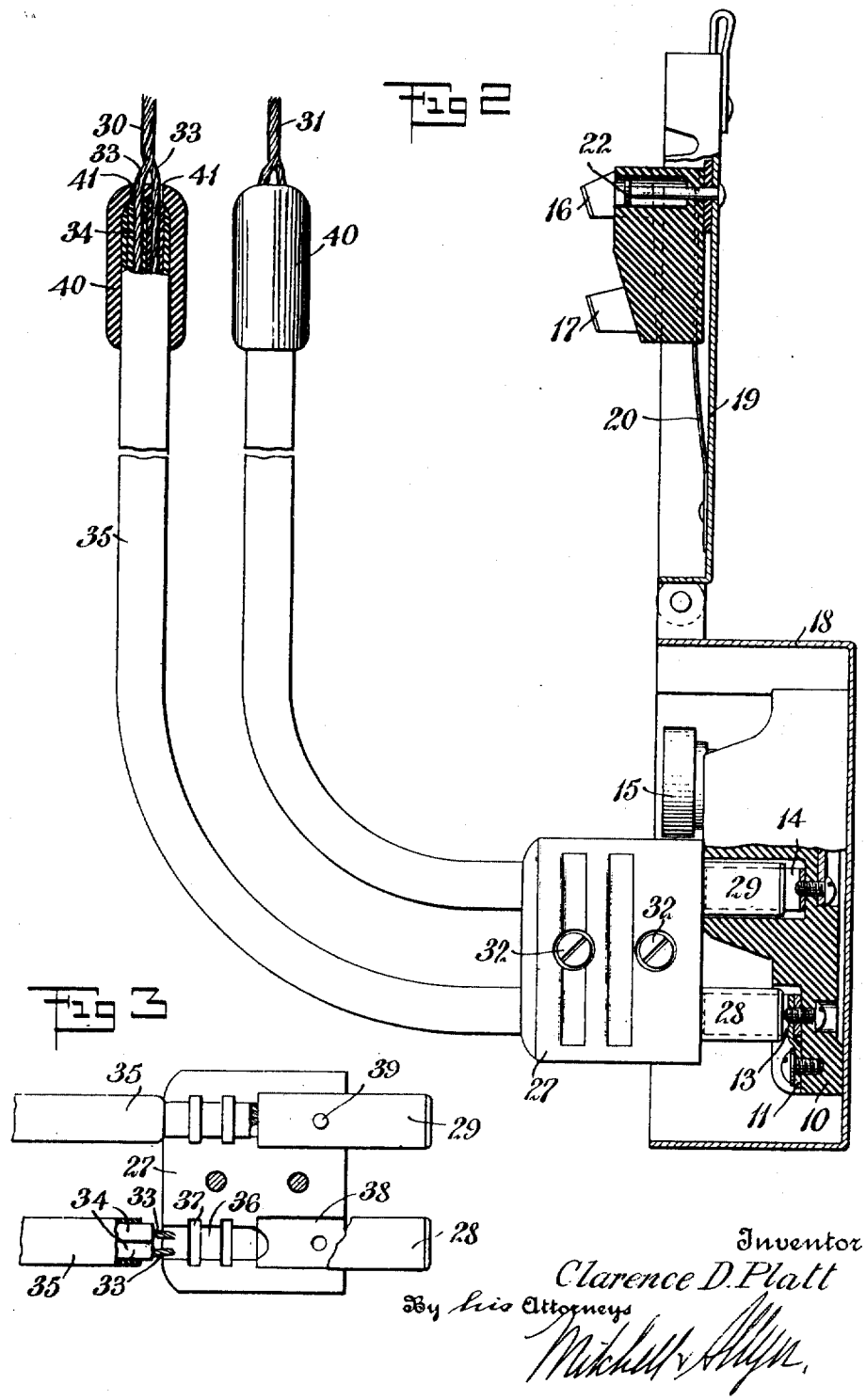

CLARENCE D. PLATT, OF BRIDGEPORT, CONNECTICUT.

METER-TESTING CONSTRUCTION.

1,237,379.  Specification of Letters Patent.  Patented Aug. 21, 1917.

Application filed December 4, 1916. Serial No. 134,855.

*To all whom it may concern:*

Be it known that I, CLARENCE D. PLATT, a citizen of the United States of America, residing at Bridgeport, Connecticut, have invented a new and useful Meter-Testing Construction, of which the following is a specification.

My invention relates to a construction by means of which an electric meter may be readily tested to determine accuracy in an ordinary lighting system or the like, without the necessity of disconnecting any of the main or branch wires.

In the drawing I have illustrated a type of switch such as is used in household lighting systems for instance, as an entrance switch. This switch has two sets of stationary jaws which are normally connected by blades when the current is "on." The meter to be tested is, of course, permanently in the circuit. My invention contemplates the use of a special type of plug and cords for each set of jaws to be connected to the test meter.

Figure 1 is a front view or elevation showing a switch in the open circuit position so far as the regular switch blades are concerned, but with the meter testing connections and partly in diagram.

Fig. 2 is a side elevation and partial sectional view on the plane of the line 2—2, Fig. 1, and showing the meter testing connection.

Fig. 3 shows a part of the meter testing construction.

While this invention is not concerned with the details of construction of the switch which is claimed in my application No. 112,710, the operation will be better understood by briefly describing the switch. The insulating base 10 carries a pair of main line terminals 11—11 and branch terminals 12—12. Spring switch jaws 13—13 are connected to terminals 11—11 and similar jaws 14—14 are connected to the terminals 12—12 through the medium of suitable fuse plugs 15—15. Each side of the switch is "closed" for normal operation by means of blades 16 and 17 which engage jaws 13 and 14 respectively. In the form shown the switch is inclosed in a box 18 having a hinged cover 19. The movable switch blades are carried indirectly by the spring arms 20—20 from which they are insulated, for instance, by an insulating member 21. This allows the cover 19 to have a limited free movement relative to the switch blades 16 and 17 so that when the cover of the box is opened the blades 16 and 17 will lag behind in their frictional engagement with the jaws 13 and 14 and separate by a snap action when the ends of the blades 16 and 17 are free of the respective jaws. The movement of the blades 16 and 17 relative to the cover 19 is limited by the stop 22.

The meter which is in use permanently in the system is indicated diagrammatically at 25 as connected with the terminals 12—12. The meter which is to be used for testing is indicated diagrammatically at 26 as connected between the blades 13—14 on each side.

The construction used for connecting the test meter to the switch has a hand-piece 27 with two blades 28 and 29 and electrically connected respectively with two flexible conductors, 30 and 31. The hand-piece is preferably formed in two parts as shown and secured together for instance, by means of screws 32—32. Each conductor is preferably made up of two parts 33—33 and each part made up of a plurality of fine wires so as to be flexible. Each part may be inclosed in an insulating envelop 34 and the pair of parts inclosed by a protecting sheath 35 of suitable durable characteristics. The two parts of the hand-piece are preferably provided with recesses as at 36 somewhat smaller in diameter than the sheath so that the sheath can be compressed into these recesses when the parts are secured together by the screws 32—32. Grooves 37 are preferably provided at intervals along the recesses 36 so as to permit the material of which the sheath is made to bulge into the grooves and thus hold the sheath between the parts of the hand-piece. Preferably the parts of the hand-piece are also recessed as at 38 to receive the blades and the blades may be provided with projections 39 to assist in holding the blades in place between the parts and hand-piece.

The outer ends of the conductors are protected by an insulating member 40 which may be termed a thimble. These thimbles are provided with passages 41—41 at the outer ends for the two parts 33—33 of the conductor, and the ends of the conductors are twisted together so as to securely lock the thimble in place on the sheath and so as to afford convenient means for attachment to the test meter.

It will be readily seen from the foregoing and from the accompanying drawings that to test the main meter it is merely necessary to open the switch and insert the terminal blades of two connecting devices in the respective jaws of the switch. The test meter being connected to the conductors 30—31, the reading can be immediately taken and checked with the house meter.

I claim:—

1. In a construction of the character described, a hand-piece formed in two parts, each part having a recess for a conductor sheath, said recesses being opposite each other when the parts are assembled, at least one of said parts having a groove extending laterally from its recess, a terminal member secured between the two parts of said hand-piece, an electric conductor connected to said terminal member, a non-conducting sheath surrounding said conductor, said sheath extending into said groove and the diameter of said sheath outside of said hand-piece being greater than the diameter of the recess formed between the parts of the hand-piece and means for drawing the two parts of the hand-piece together and thereby clamping the non-conducting sheath in said recesses and groove.

2. In a construction of the character described, the combination of a hand-piece formed of two parts of insulating material, each part having a longitudinally extending recess and a groove extending laterally from said recess, a conductor, an insulating sheath surrounding the conductor, a terminal member connected to said conductor, and means for drawing the two parts of the hand-piece together and thereby compressing the material of the sheath in said recesses and forcing portions of the material of the sheath into said grooves.

3. In a construction of the character described, the combination of two flexible conducting members, an insulating sheath surrounding the same, an insulating thimble surrounding the end of said sheath and having passages for the ends of said conductors, the ends of said conducting members being twisted together beyond the end of said thimble.

4. A meter testing device comprising an insulating hand-piece, two terminal members extending from one end thereof adapted to be inserted in suitable sockets, two flexible conductors extending from the opposite end of said hand-piece and electrically connected to said terminal members, non-conducting sheaths on said conductors and insulating thimbles on the ends of said sheaths remote from said hand-piece, said conductors extending beyond said thimbles.

CLARENCE D. PLATT.

Copies of this patent may be obtained for five cents each, by addressing the "Commissioner of Patents, Washington, D. C."